US010850360B2

(12) United States Patent
Tanaka

(10) Patent No.: US 10,850,360 B2
(45) Date of Patent: Dec. 1, 2020

(54) INFORMATION MEASURING DEVICE

(71) Applicant: Okuma Corporation, Niwa-Gun (JP)

(72) Inventor: Takaaki Tanaka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 418 days.

(21) Appl. No.: 15/655,013

(22) Filed: Jul. 20, 2017

(65) Prior Publication Data

US 2018/0029185 A1 Feb. 1, 2018

(30) Foreign Application Priority Data

Jul. 29, 2016 (JP) ................................. 2016-150315
Jun. 19, 2017 (JP) ................................. 2017-119828

(51) Int. Cl.
*B23Q 17/09* (2006.01)
*G01M 13/028* (2019.01)

(52) U.S. Cl.
CPC ..... *B23Q 17/0971* (2013.01); *B23Q 17/0957* (2013.01); *B23Q 17/0961* (2013.01); *G01M 13/028* (2013.01)

(58) Field of Classification Search
None
See application file for complete search history.

(56) References Cited

U.S. PATENT DOCUMENTS

| 5,825,657 A * | 10/1998 | Hernandez | G01M 13/028 |
| | | | 702/182 |
| 7,536,237 B2 * | 5/2009 | Esterling | B23Q 17/0961 |
| | | | 700/170 |
| 2013/0073251 A1 * | 3/2013 | Nishimura | G05B 19/4062 |
| | | | 702/147 |
| 2013/0164092 A1 * | 6/2013 | Kondo | G05B 19/404 |
| | | | 409/132 |
| 2014/0123740 A1 | 5/2014 | Yoshikawa et al. | |
| 2015/0032389 A1 * | 1/2015 | Hedin | G01M 13/00 |
| | | | 702/34 |
| 2015/0194805 A1 * | 7/2015 | Sagasaki | G05B 19/4062 |
| | | | 318/569 |
| 2015/0261207 A1 * | 9/2015 | Wunderlich | G05B 19/4065 |
| | | | 700/175 |

FOREIGN PATENT DOCUMENTS

| JP | 2004-126956 A1 | 4/2004 |
| JP | 2012-254499 A1 | 12/2012 |

* cited by examiner

*Primary Examiner* — Lina M Cordero
(74) *Attorney, Agent, or Firm* — Burr & Brown, PLLC

(57) ABSTRACT

An information measuring device includes a sensor that obtains information on a phenomenon periodically occurring on an apparatus while being synchronized with the steady repetition of an operation and a control device. The control device associates the obtained information with an operation phase in the operation so as to generate change in the phenomenon in one cycle based on the information obtained during the operation of several times. Meanwhile, an operation cycle where the operation is repeated in the apparatus, a sampling cycle, and a duration where the operation is steadily repeated in the apparatus are included in measurement parameters. The control device calculates an optimum measurement parameter from a relation between the measurement parameters on at least one of the measurement parameters and changes the measurement parameter as a target to the optimum measurement parameter.

4 Claims, 9 Drawing Sheets

INFORMATION MEASURING DEVICE

BACKGROUND

This application claims the benefit of Japanese Patent Application Nos. 2016-150315 and 2017-119828 each filed on Jul. 29, 2016, and Jun. 19, 2017, the entirety of which is incorporated by reference.

Technical Field

This disclosure relates to an information measuring device that obtains information from, for example, a rotary shaft device for performing machining while rotating a tool or a workpiece.

Related Art

Conventionally, in a machine tool that performs machining while rotating a rotary shaft, it is common to measure vibrations, drive force, and similar factor during operation and to perform a diagnosis based on a measurement result when state diagnosis of the machine tool itself and machining diagnosis are performed. For example, when a tool is mounted on the rotary shaft to perform a cutting work on a workpiece, the drive force of the rotary shaft during the cutting work is measured, whereby cutting amount is identified and the condition of a cutting tool is detected.

Japanese Patent Application Publication No. 2004-126956 discloses a numerical control machine where drive force generated during cutting is calculated based on a cutting volume obtained from shape data of a machining target and a machining path, and a material quality of a workpiece, and the calculated drive force is compared with the actually measured drive force, thereby detecting abnormal machining.

Furthermore, Japanese Patent Application Publication No. 2012-254499 discloses an abnormality detecting device and method where in a case where machining is repeatedly performed, drive force of a previous normal machining is compared with drive force actually measured in current machining, thereby detecting abnormal machining.

In addition, recently, there has been an attempt where a vibration sensor and an AE sensor are mounted on some units of a machine tool and a displacement sensor is employed to more clearly measure phenomena occurring on the machine tool other than the drive force of the rotary shaft.

However, in the conventional methods, measurements with considerably short sampling cycles are required for detecting change in desired phenomena such as cycles for performing driving of the rotary shaft and the cutting, vibration cycles unique to a bearing and guide parts. For example, in measuring change in the drive force of every cutting blade during cutting with use of a rotating tool having six cutting blades, the cutting cycle is 100 μsec in the case of a rotation speed of 10000 $min^{-1}$. Therefore, for sampling at ten points for each cutting blade, the sampling cycle is necessary to be shorter than 10 μsec. Then, when such high speed sampling is required, it is a problem that the measurement and the analysis are costly.

Therefore, the present disclosure has been made in view of the above-described problems, and it is an object of the disclosure to provide an information measuring device configured to obtain accurate measurement results at low costs without performing samplings on change in the phenomena occurring on a predetermined device at the very short cycle as in the conventional methods.

SUMMARY

In order to achieve the above-described object, there is provided an information measuring device according to a first aspect of the disclosure. The information measuring device is mounted on an apparatus that steadily repeats a predetermined operation. The information measuring device includes a sensor that obtains information on a phenomenon. The phenomenon periodically occurs on the apparatus while being synchronized with the steady repetition of the operation. The information measuring device includes a control device that controls the operation of the apparatus and obtains the information via the sensor. The control device may obtain the information via the sensor at a predetermined sampling cycle, and the control device may associate the obtained information with an operation phase in the operation so as to generate change in the phenomenon in one cycle based on the information obtained during the operation of several times. Meanwhile, an operation cycle where the operation is repeated in the apparatus, the sampling cycle, and a duration where the operation is steadily repeated in the apparatus may be included in measurement parameters. The control device may calculate an optimum measurement parameter from a relation between the measurement parameters on at least one of the measurement parameters and may change the measurement parameter as a target to the optimum measurement parameter.

According to a second aspect of the disclosure, in the first aspect of the disclosure, the information measuring device may be mounted on the rotary shaft device that includes the rotary shaft, and the information measuring device may include the sensor and the control device. The sensor may obtain information on a phenomenon periodically occurring on the rotary shaft device while being synchronized with rotations of the rotary shaft, and the control device may control the operations of the rotary shaft device and obtain the information via the sensor. The control device may associate the information obtained with the sampling cycle via the sensor with a rotation phase of the rotary shaft so as to generate change in the phenomenon in one cycle based on the information obtained during the rotations of the rotary shaft of several times. Meanwhile, a rotation cycle of the rotary shaft, the sampling cycle, and a duration of a steady zone where a rotation speed of the rotary shaft is stable at a constant speed may be included in the measurement parameters.

According to a third aspect of the disclosure, in the first aspect of the disclosure, the control device may calculate the optimum measurement parameter such that a division number of the phenomenon per cycle is a desired division number.

According to a fourth aspect of the disclosure, in the second aspect of the disclosure, the control device may calculate the optimum measurement parameter such that a division number of the phenomenon per cycle is a desired division number.

With the information measuring device according to the embodiment, the control device obtains the information via the sensor at a predetermined sampling cycle, and the control device associates the obtained information with an operation phase in the operation in the apparatus so as to generate change in the phenomenon in one cycle based on the information obtained during the operation of several times. An operation cycle where the operation is repeated in the apparatus, the sampling cycle, and a duration where the operation is steadily repeated in the apparatus are included in the measurement parameters, the control device calculates the optimum measurement parameter from a relation between the measurement parameters on at least one of the measurement parameters, and the control device changes the measurement parameter as a target to the optimum measurement parameter. Accordingly, while the measurement is performed at a long sampling cycle compared with a conventional method, effective measurement results are obtained on the phenomenon changing at high speed, for example, the change in the driving load of the main spindle, thus ensuring cost reduction. The measurement can be performed on the phenomenon where it is technically difficult for the conventional method to measure because of a short cycle of change in the phenomenon.

With the information measuring device according to the third and the fourth aspects of the disclosure, the control device may calculate the optimum measurement parameter such that the division number of the phenomenon per cycle is the desired division number, thus providing the measurement parameter without uselessness in obtaining information for generating the waveform.

DETAILED DESCRIPTION

The following describes a machine tool that includes an information measuring device as one embodiment of the disclosure in detail based on the drawings.

Figure 1:
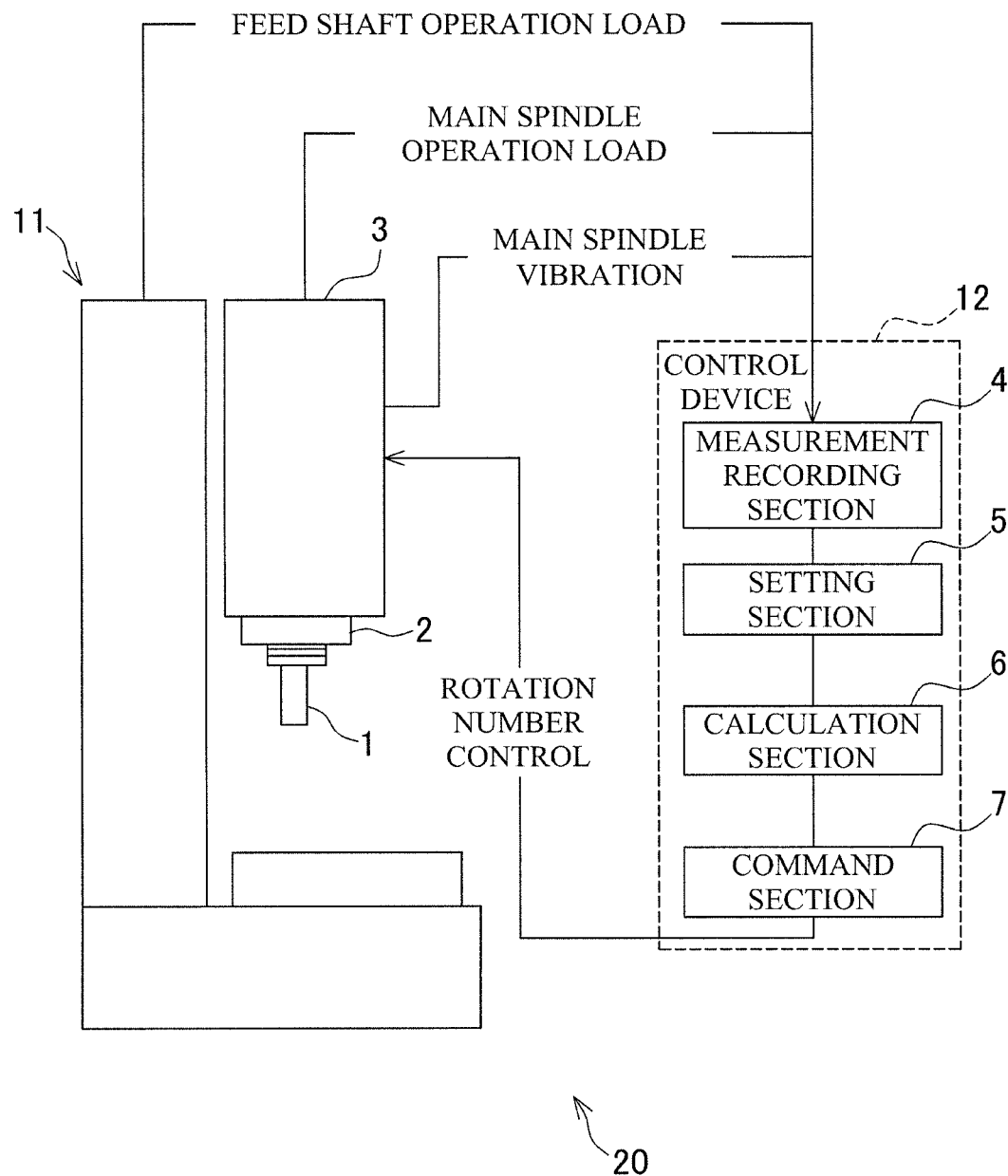
FIG. 1 is an explanatory drawing illustrating a machine tool.

FIG. 1 is an explanatory drawing illustrating a machine tool 20.

The machine tool 20 is what is called a machining center, and includes a machining center main body 11 and a control device 12. The machining center main body 11 has a main spindle head 3 that includes a main spindle 2 as a rotary shaft, a driving device (not illustrated) for rotating the main spindle 2, and similar unit. The main spindle 2 has a distal end to which a tool holder 1 including a tool is installable. On the main components of the machining center main body 11 including the main spindle head 3, a sensor (a sensor measuring, for example, a power requirement of the driving device, as one component of the information measuring device) for measuring drive force of the main spindle 2, a sensor for measuring vibration generated on the machining center main body 11, and similar sensor are installed. On the other hand, the control device 12 controls operations of the main spindle 2, and diagnoses conditions of the machining center main body 11 and machining by the machining center main body 11. The control device 12 is coupled to the above various sensors, and includes a measurement recording section 4, a setting section 5, a calculation section 6, and a command section 7. The measurement recording section 4 measures to record various pieces of information on the machining center main body 11. The setting section 5 allows an operator to set various kinds of setting values such as a sampling cycle described later. The calculation section 6 performs various kinds of arithmetic operations. The command section 7 commands operations (for example, commands the number of the rotation of the main spindle 2) to the machining center main body 11 based on the arithmetic result by the calculation section 6, and similar result.

Figure 2:
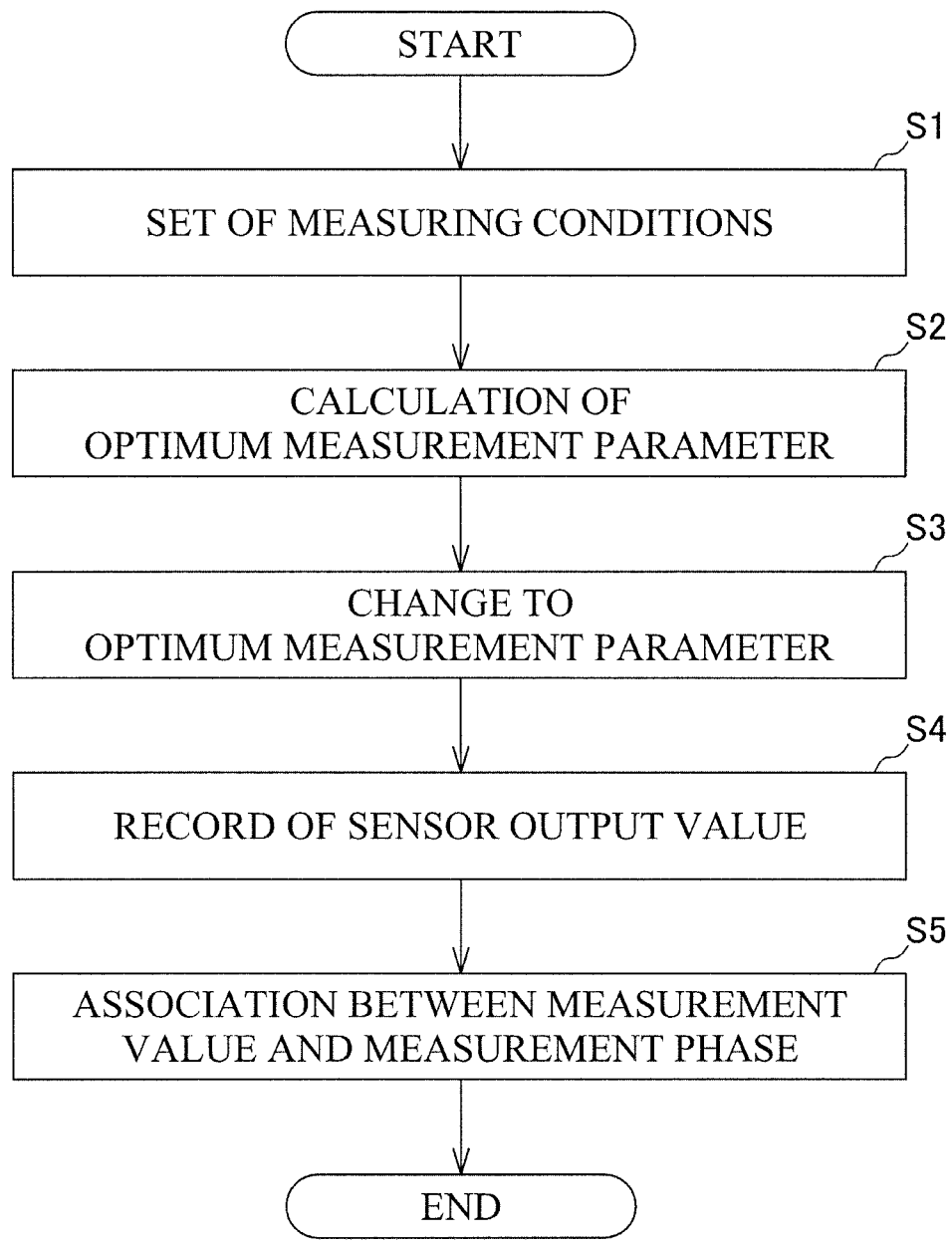
FIG. 2 is a flowchart illustrating a control on a measurement of a phenomenon occurring on a machining center main body.

The following describes a control, as a main part of the disclosure, on a measurement of a phenomenon occurring on the machining center main body 11 along a flowchart of FIG. 2.

In measuring change in a driving load of the main spindle 2, first, the control device 12 sets measuring conditions including a division number $D_N$ per rotation of the main spindle 2 (S1). At this time, the division number $D_N$ is simply set according to an occurring cycle of a phenomenon desired to be measured. For example, in measuring change per blade of a tool having two cutting blades, when ten measurement points are disposed per blade, the division number $D_N$ is simply set to 20.

Next, the control device 12 calculates an optimum measurement parameter so as to be the set division number $D_N$, that is, an optimum rotation cycle $L_{TO}$ or an optimum sampling cycle $S_{TO}$ of the main spindle 2 (S2), and the control device 12 changes a rotation cycle $L_T$ or a sampling cycle $S_T$ to the calculated optimum rotation cycle $L_{TO}$ or optimum sampling cycle $S_{TO}$ (S3). A relation among the division number $D_N$, the rotation cycle $L_T$, and the sampling cycle $S_T$ can be indicated by the following formula (1). Accordingly, a phase difference between the rotation cycle $L_T$ and the sampling cycle $S_T$ is simply 1/the division number $D_N$ (in the above example, 1/20).

Therefore, when the rotation cycle $L_T$ is constant and the sampling cycle $S_T$ is changed, the following formula (2) is used for the arithmetic operations.

Here, a specific description will be given of the calculation of the optimum sampling cycle $S_{TO}$ with an example where the rotation cycle $L_T$ of the main spindle 2 is 40 msec (1500 min$^{-1}$) and the originally set sampling cycle $S_T$ is 500 msec. When the original set values are above-described values, the sampling is performed (the measurement values are obtained) every time the main spindle 2 rotated 25 times. Accordingly, when the sampling is performed with 1/20 of the rotation cycle $L_T$ (in other words, every measurement value is obtained during one rotation of the main spindle 2), the sampling cycle $S_T$ is 1 msec, thus a sampling function at a considerably high speed is required. Therefore, the formula (2) is used for calculating the sampling cycle $S_T$ with a longer cycle as the optimum sampling cycle $S_{TO}$. At this time, the arithmetic operation may be performed in an order from n=0. However, a significant change of the sampling cycle $S_T$ has an influence on the number of the measurement values and similar number, thus the amount of change in changing to the optimum sampling cycle $S_{TO}$ is preferred to be small. Then, in this example, the sampling cycle $S_T$ is 12.5 times of the rotation cycle $L_T$, thus the optimum sampling cycle $S_{TO}$ is simply calculated with n=12. That is, the optimum sampling cycle $S_{TO}$ is 478 msec. When the sampling cycle $S_T$ cannot be changed to 500 msec or less, the optimum sampling cycle $S_{TO}$ is simply to be 518 msec with n=13.

On the other hand, in the case where it is difficult to change the sampling cycle $S_T$ and similar case, the following formula (3) is used for the arithmetic operation having the sampling cycle $S_T$ to be constant and the rotation cycle $L_T$ to be changed.

In this case again, a specific description will be given of the calculation of the optimum rotation cycle $L_{TO}$ with an example where the rotation cycle $L_T$ of the main spindle 2 is 40 msec (1500 min$^{-1}$) and the originally set sampling cycle $S_T$ is 500 msec. Here again, the arithmetic operation may be performed in an order from n=0. However, a significant change of the rotation cycle $L_T$ possibly generates abrasion and breakage of the tool and similar failure so as to fail to perform intended machining. Accordingly, the amount of change in changing to the optimum rotation cycle $L_{TO}$ is preferred to be small. Therefore, focusing on the sampling cycle $S_T$ that is 12.5 times of the rotation cycle $L_T$ similar to the case of the calculation of the optimum sampling cycle $S_{TO}$, the optimum rotation cycle $L_{TO}$ is simply calculated with n=12. That is, the optimum rotation cycle $L_{TO}$ is 42.8 msec.

[Expression 1]

$$D_N = 1 - 1 \Big/ \left( \frac{S_T}{L_T} \cdot \left[ \frac{S_T}{L_T} \right] \right) \quad (1)$$

$$S_{TO} = \left( n - \frac{1}{D_N} \right) \times L_T \quad (n = 1, 2, 3 \ldots) \quad (2)$$

$$L_{TO} = S_T \Big/ \left( n - \frac{1}{D_N} \right) \quad (n = 1, 2, 3 \ldots) \quad (3)$$

Figure 4:
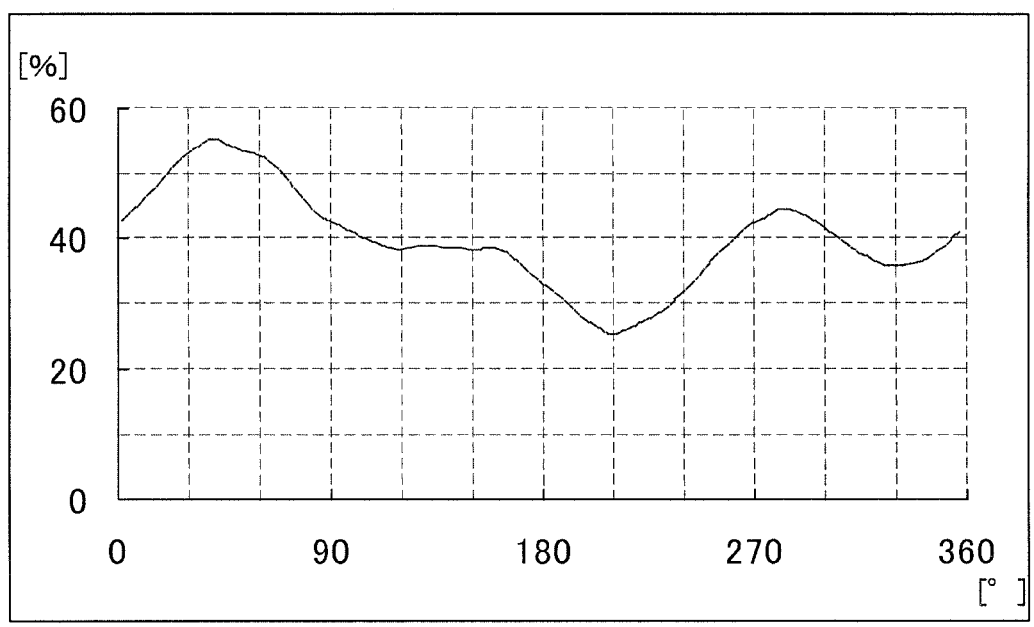
FIG. 4 is an explanatory drawing illustrating a waveform generated by obtaining measurement values at a sufficiently high speed sampling cycle.
Figure 5:
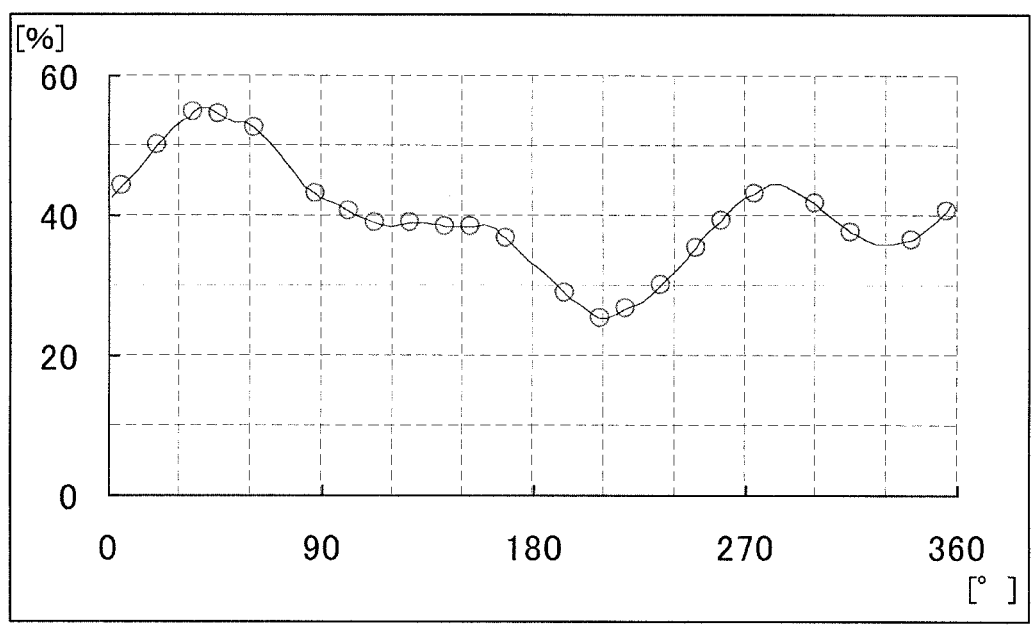
FIG. 5 is an explanatory drawing illustrating a waveform generated with a method according to the disclosure.

Then, after the above-described change to the optimum rotation cycle $L_{TO}$ or the optimum sampling cycle $S_{TO}$, in a state where the main spindle 2 is rotated at the originally set rotation cycle $L_T$ (or the changed optimum rotation cycle $L_{TO}$), the sensors obtain the measurement values at the changed optimum sampling cycle $S_{TO}$ (or originally set sampling cycle $S_T$) (S4), and the obtained measurement values are associated with rotation phases (hereinafter referred to as measurement phases) where the measurement values are obtained (S5). Furthermore, the measurement values thus obtained during the rotation of the main spindle 2 of several times are arranged based on the measurement phases. Then, for example, a waveform illustrated in FIG. 5, that is, a waveform that indicates the change in the driving load during one rotation of the main spindle 2 (change in a predetermined phenomenon in one cycle, and here, the horizontal axis is a rotation phase and the vertical axis is a driving load value) is obtained. Then, thus generated waveform can be considered as a sufficiently effective waveform approximately equal to the waveform generated with the measurement values obtained at a sufficiently high speed sampling cycle as illustrated in FIG. 4, for example.

Figure 3:
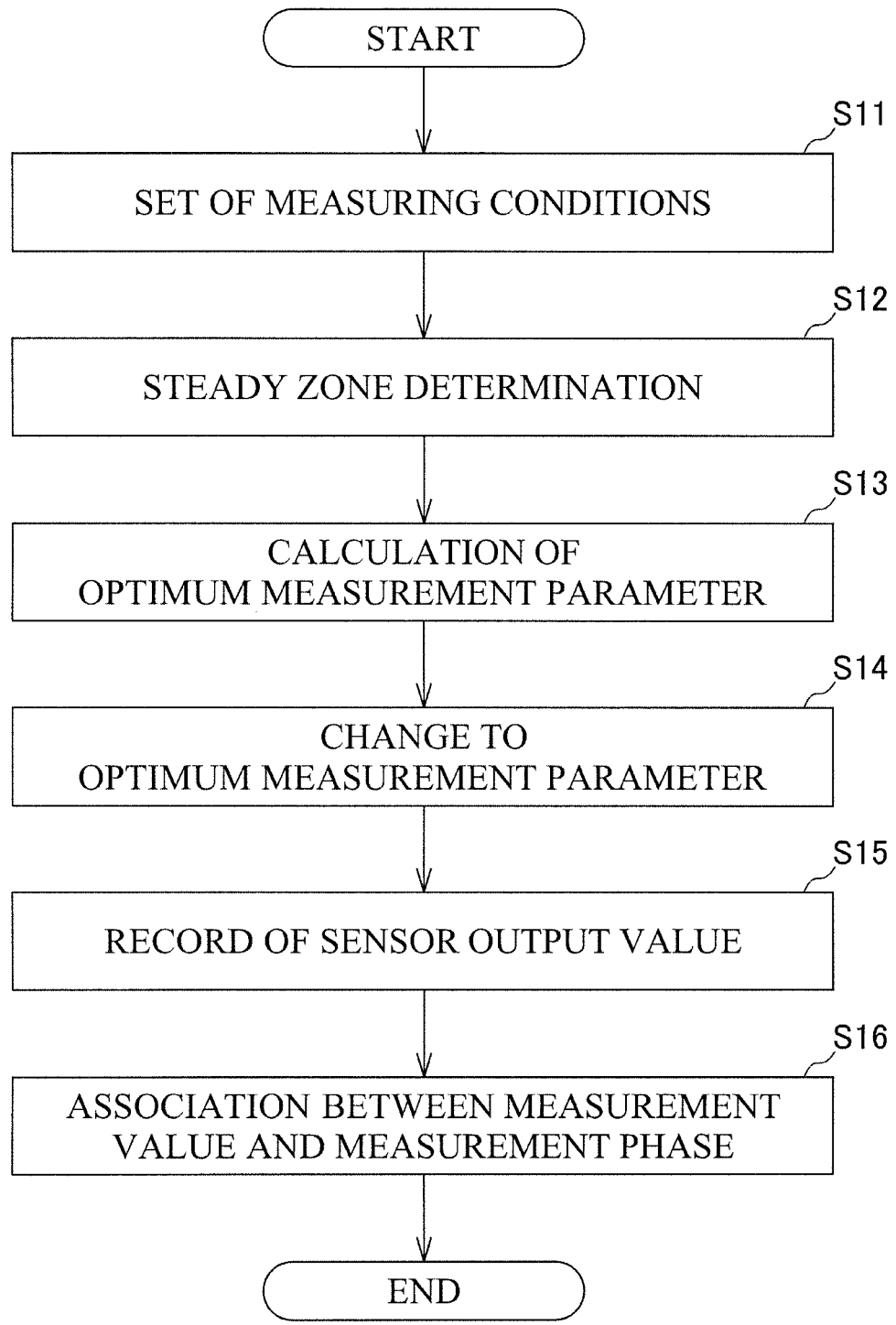
FIG. 3 is a flowchart illustrating a control on a measurement of a phenomenon occurring on a machining center main body.

In the above-described method, the waveform is obtained focusing on only the rotation cycle $L_T$ and the sampling cycle $S_T$. However, for obtaining the accurate waveform according to the change in the driving load of the main spindle 2, the main spindle 2 is required to have the steadily changing driving load, and when focusing on only the rotation cycle $L_T$ and the sampling cycle $S_T$ as described above, all measurement values required for generating the waveform are not necessarily obtained. Therefore, a description will be given of a method for calculating the optimum measurement parameter while determining whether or not it is a steady zone where the driving load of the main spindle 2 steadily changes (that is, the rotation speed of the main spindle 2 is stable at a constant speed) along the flowchart in FIG. 3.

First, similarly to above-described S1, the control device 12 sets measuring conditions including a division number $D_N$ per rotation of the main spindle 2 (S11). Next, it is determined to be whether or not a period where a predetermined phenomenon (here, the driving load) periodically changes on the main spindle 2, that is, whether or not it is a steady zone (S12). The determination may be performed based on, for example, the operation program of the machine tool 20, may be performed based on the values calculated by using a machining simulation or similar method, and may be performed based on whether or not it is within a period preliminarily set from the start of the operation.

Subsequently, the optimum measurement parameter is calculated (S13). First, a description will be given of a method for calculating the optimum measurement parameter based on a duration of the steady zone. Assume that the optimum sampling cycle $S_{TO}$=518 msec is calculated with n=13 in a case where the rotation cycle $L_T$ of the main spindle 2 is 40 msec and the originally set sampling cycle $S_T$ is 500 msec similar to the above description. In this case, at least 20-time sampling is required for measuring the change in the phenomenon by one rotation of the main spindle 2. Then, for performing 20-time sampling, the steady zone is required to be continued for 518 msec×20=10.4 sec. Here, when the measurement is performed on a cutting distance 80 mm where identical machining is executed and a cutting feed speed of 600 mm/min, 20-time sampling cannot be performed because the duration of the steady zone (that is, a period where the identical machining is executed and a machining period taken for the cutting distance 80 mm) is only 8.0 sec. Accordingly, an n is employed such that the period necessary for 20-time sampling is 8.0 sec or less, thus calculating the optimum measurement parameter. In this example, for example, employing n=10 has the sampling cycle $S_T$=398 msec so as to be 398 msec×20=7.96 sec<8.0 sec, thus the sampling cycle $S_T$=398 msec is employed as the optimum sampling cycle $S_{TO}$.

Second, a description will be given of a method for changing the duration of the steady zone corresponding to the calculated optimum measurement parameter. Similar to the above description, assume that the optimum sampling cycle $S_{TO}$=518 msec is calculated with n=13 in a case where the rotation cycle $L_T$ of the main spindle 2 is 40 msec and the originally set sampling cycle $S_T$ is 500 msec. In this case, the identical machining is required to be executed for 10.4 sec. Accordingly, for the measurement on the cutting distance 80 mm where the identical machining is executed, the cutting feed speed is simply 461 mm/min such that the duration of the steady zone (that is, the period taken for the machining on the cutting distance 80 mm) is 10.4 sec or more (the originally set speed 600 mm/min is decelerated to 461 mm/min).

Third, a description will be given of a method for calculating the optimum measurement parameter based on the duration of the steady zone such that the measurement value is obtained with an achievable highest resolution. For example, in the case where the sampling at 40 msec is the limit under the condition of the rotation cycle $L_T$ of the main spindle 2 of 40 msec and the duration of the steady zone of 5.0 sec, one sampling during one rotation of the main spindle 2 is the limit. Accordingly, it is allowed to divide into 125 at maximum during one rotation, and the measurement with the highest resolution is performed at the optimum sampling cycle $S_{TO}$=40.32 msec.

Subsequently to the calculation of the optimum measurement parameter as described above, the set measurement parameter is changed to the optimum measurement parameter (S14), the measurement value is obtained from the machine tool 20 that operates corresponding to the set measurement parameter (S15), and the obtained measurement value is associated with the measurement phase (S16). Then, the measurement values thus obtained during the rotation of the main spindle 2 of several times are arranged based on the measurement phases so as to obtain, similarly to the above description, the waveform that indicates the change in the driving load during one rotation of the main spindle 2.

Furthermore, for example, when the occurrence of the failure such as the loss of the cutting blade of the tool is suspected, it may be considered to change the measurement parameter (S3 and S14) for intensive measurement on a specific phase. The following describes the method.

As the method for detecting the failure from the change of the phenomenon, there is a method where a waveform obtained by the current measurement is compared with a waveform preliminarily measured at a normal case so as to detect the failure based on a magnitude of the difference between the measurement values. For example, when the loss occurs on the cutting blade of the rotating tool, the cutting amount per blade changes, thus the failure is detected from the changes in the number of peaks in the waveform, the phase having the peak value, and the magnitude relation between the peak values. However, in this disclosure, the waveform is obtained based on the measurement values obtained during the rotation of the main spindle 2 of several times. Then, the measurement continued without changing the rotation cycle $L_T$ and the sampling cycle $S_T$ sometimes takes a time to obtain the measurement value at the specific phase. Therefore, when the comparison of the waveform obtained from the current measurement with the waveform preliminarily measured at the normal case indicates the possibility of the failure occurrence, it is preferable to change the rotation cycle $L_T$ and the sampling cycle $S_T$.

Figure 6:
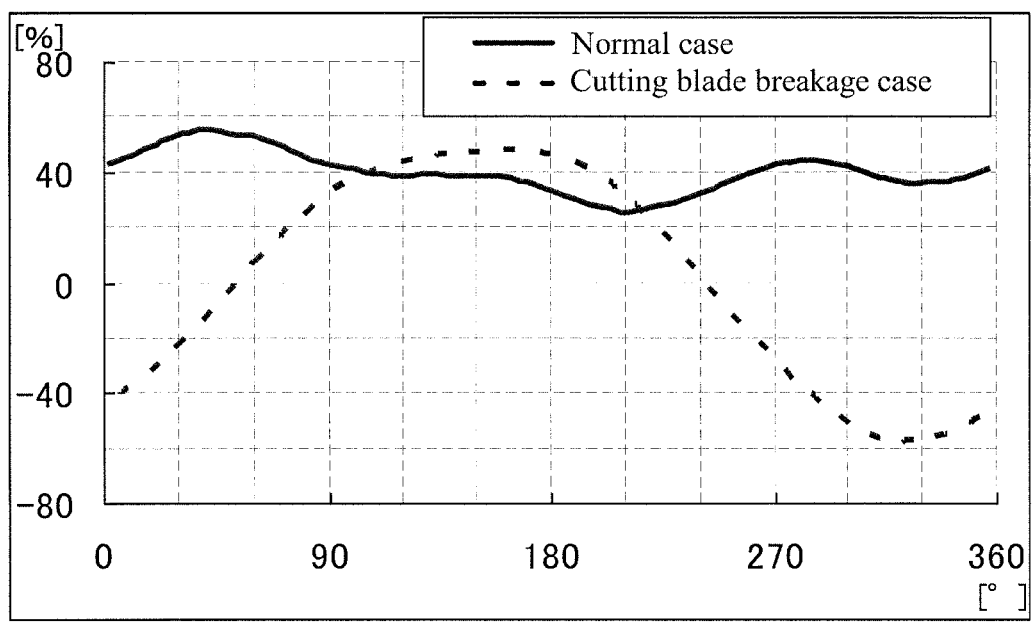
FIG. 6 is an explanatory drawing illustrating a difference between a normal case and an abnormal case in obtaining the measurement values at the sufficiently high speed sampling cycle.
Figure 7:
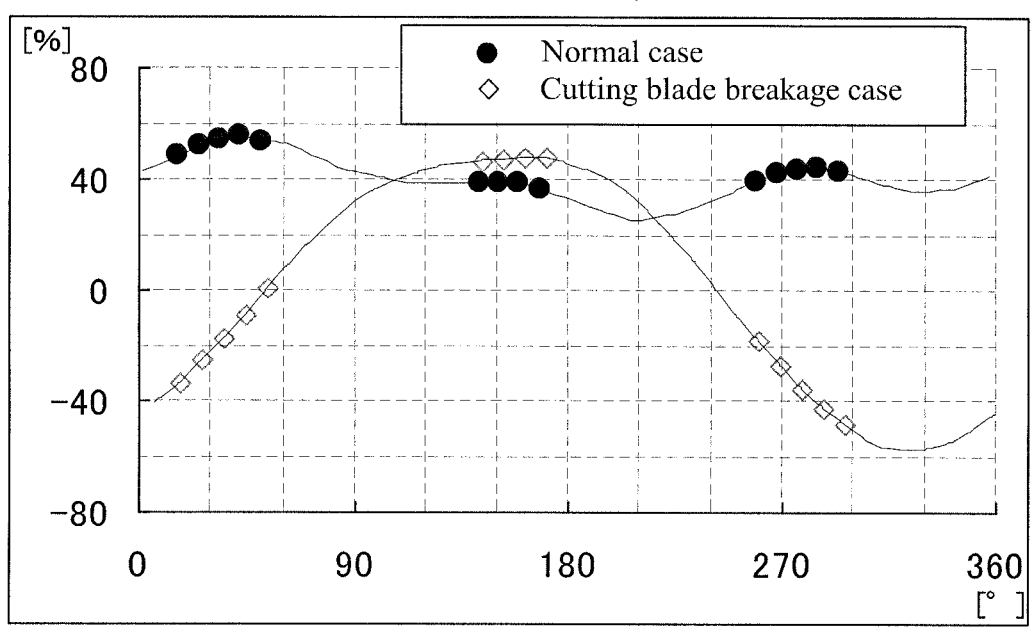
FIG. 7 is an explanatory drawing illustrating a difference between a normal case and an abnormal case in obtaining measurement values with the method according to the disclosure.

Here, a specific description will be given of a case where a tool having three cutting blades is used for machining based on FIG. 6 and FIG. 7. When the measurement values are obtained at the sufficiently high speed sampling cycle, as illustrated in FIG. 6, the normal case has the peak values of the driving load values detected in the proximities of 45°, 165°, and 285°. However, the breakage of the cutting blade of the tool causes the change in the number of the peak values, the rotation phase where the peak value is detected, and the magnitude relation and similar change. Therefore, when the sampling is performed with the method of the disclosure, it is preferred that the rotation cycle $L_T$ and the sampling cycle $S_T$ are changed at a timing when the possibility of the failure occurrence is indicated, so that the measurement is performed to be concentrated on the specific phase where the driving load value significantly changes before and after the failure occurrence. That is, the rotation cycle $L_T$ and the sampling cycle $S_T$ are changed to obtain the measurement values concentrated at the rotation phases near 45°, 165°, and 285° as illustrated in FIG. 7, thus surely detecting the failure occurrence in a short time.

Furthermore, in changing the rotation cycle $L_T$ and the sampling cycle $S_T$, the efficient measurement is performed by adjusting the timing for changing the rotation cycle $L_T$ and the sampling cycle $S_T$.

Figure 8:
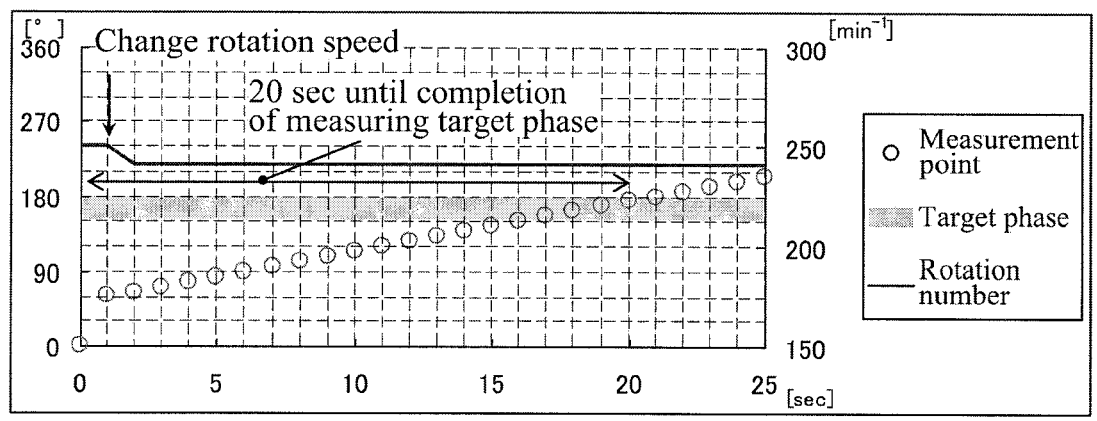
FIG. 8 is an explanatory drawing illustrating an obtaining status of measurement values when a rotation speed is changed at a first timing.
Figure 9:
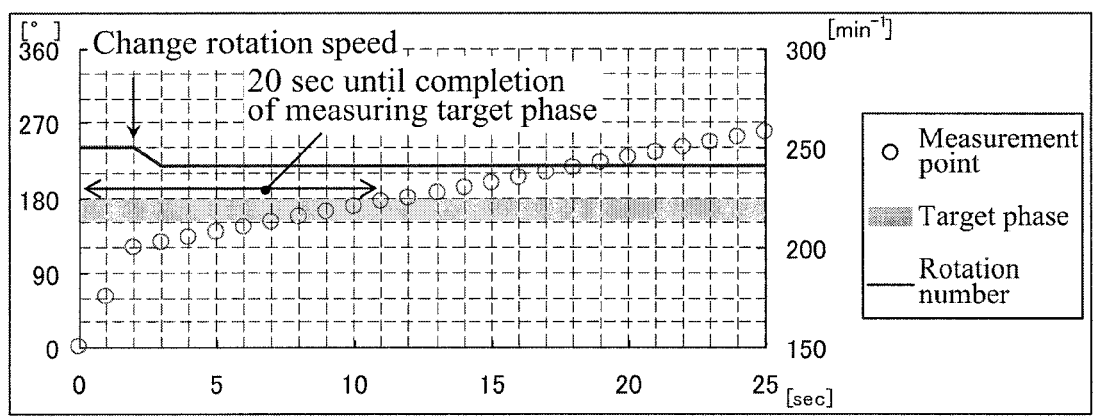
FIG. 9 is an explanatory drawing illustrating an obtaining status of measurement values when the rotation speed is changed at a second timing.

Assume that the rotation speed (the rotation cycle $L_T$) is changed. For example, in the state where the measurement values are obtained at the sampling cycle $S_T$=1.0 sec, the rotation speed is changed from 250 $min^{-1}$ to 241 $min^{-1}$ to obtain the measurement values at the larger number of measurement points. The rotation phase that has the peak value in the waveform exists between 150° and 180°, and the measurement values are obtained near the rotation phase that has the peak value. In this case, as illustrated in FIG. 8, when the rotation speed is changed after a lapse of 1.0 sec after the present time, it takes 20.0 sec until the completion of obtaining the measurement values near the specific phase as the target. However, as illustrated in FIG. 9, when the rotation speed is changed after a lapse of 2.0 sec after the present time, obtaining of the measurement values near the specific phase as the target in 11.0 sec is sometimes completed. Even in the case of changing not the rotation cycle $L_T$ but the sampling cycle $S_T$, the efficient measurement is performed by adjusting the timing for changing similarly.

According to the machine tool 20 having the above-described configuration, the driving load of the main spindle 2 are measured and the measurement values are associated with the rotation phases at the measurement of the main spindle 2, the measurement and the association are continued during the rotation of the main spindle 2 of several times, and the measurement values are obtained at various rotation phases, thus finally obtaining the change in the drive force during one rotation of the main spindle 2. Furthermore, the rotation cycle $L_T$ and the sampling cycle $S_T$ of the main spindle 2, and the duration of the steady zone where the rotation speed of the main spindle 2 is stable at the constant speed are included in the measurement parameters, and on at least one of the measurement parameters, the optimum measurement parameter is calculated from the relation between the measurement parameters. Accordingly, while the measurement is performed at a long sampling cycle compared with a conventional method, effective measurement results are obtained on the phenomenon changing at high speed, for example, the change in the driving load of the main spindle 2, thus cost reduction is achieved. The measurement can be performed on the phenomenon where it is technically difficult for the conventional method to measure because of a short cycle of change in the phenomenon.

The configuration according to the information measuring device of the disclosure is not limited to the above-described embodiment, and not only the overall configuration of the apparatus as the target of the information measurement but also the configuration according to the control of the measurement of the phenomenon and similar control can be changed as necessary without departing from the spirit of the disclosure.

For example, while the above embodiment describes the apparatus for the target of the measurement by the information measuring device as the machining center main body of the machining center, the disclosure is preferably applicable to the other machine tool and rotary shaft device such as a lathe main body of a lathe and a feed shaft device.

While the above embodiment describes the driving load of the main spindle as the phenomenon that periodically changes, the phenomenon is not limited to this. For example, the phenomenon may be a driving load of the other drive shaft such as a feed shaft, or may be vibration, displacement, temperature and similar phenomenon generated on the rotary shaft device. Furthermore, the phenomenon may be, for example, a difference between an encoder of a moving shaft and a rotary shaft, and the command value. Specifically, a vibration sensor (sensor) may be mounted on the feed shaft (the rotary shaft) so as to rotate the feed shaft at a constant speed to measure the vibration in moving a moving body. Thus obtained measurement result ensures the diagnosis on the condition of a bearing and a ball screw according to the move of the feed shaft.

Furthermore, there is no problem to employ other apparatus as the measurement target not limiting to the apparatus that performs the rotating movement insofar as the apparatus is an apparatus that steadily repeats a predetermined operation, for example, an apparatus that has a reciprocating linear motion unit and a supply pump that performs an intermittent operation.

Furthermore, the phenomenon that periodically occurs on the apparatus synchronized with steady repetition of the operation on the apparatus is not limited to the phenomenon of integral multiple or 1/integer of the operation cycle. For example, in a feed shaft that employs a linear drive bearing unit, a cycle period of a rolling element of the linear drive bearing unit is generated in conjunction with a drive shaft rotation cycle of the feed shaft, thus the cycle period of the rolling element of the linear drive bearing unit may be employed as the phenomenon to be measured. Then, in this case, for example, when a length of the rolling element of a linear guide is 220 mm, and a feed rate of the feed shaft per rotation of the drive shaft is 50 mm, the operation phase and similar phase are simply calculated having the change of the drive shaft of the feed shaft by 4.4 rotations as one cycle.

In addition, the determination whether or not the periodical change in the phenomenon repeatedly occurs during the predetermined operation being repeated several times may be verified in real-time from a workpiece, a tool 3D model, a tool path and similar factor, or may be preliminarily analyzed by using, for example, a CAM (computer aided manufacturing). The other sensor may be employed for the determination. For example, cutting amount and feed speed may be determined with the measurement by image determination and a laser.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An information measuring device mounted on an apparatus, the apparatus steadily repeating a predetermined operation, the information measuring device comprising:
    a sensor that is configured to sense a phenomenon, the phenomenon periodically occurring on the apparatus while being synchronized with the steady repetition of the predetermined operation; and
    a control device that controls the predetermined operation of the apparatus and obtains information via the sensor, wherein:
    the control device obtains the information via the sensor at a sampling cycle, and the control device associates the information with an operation phase in the predetermined operation so as to generate change in the phenomenon in one cycle based on the information obtained during the predetermined operation performed several times,
    meanwhile, an operation cycle where the predetermined operation is repeated in the apparatus, the sampling cycle, and a duration where the predetermined operation is steadily repeated in the apparatus are included in measurement parameters,
    the control device calculates at least one of:
        an optimum sampling cycle according to formula:

optimum sampling cycle $(S_{TO})=(n-1/D_N)\times L_T$ $(n=1, 2, 3, \ldots)$, and an optimum operation cycle according to formula:

optimum operation cycle $(L_{TO})=S_T/(n-1/D_N)$ $(n=1, 2, 3, \ldots)$, where $S_{TO}$=optimum sampling cycle, $D_N$=number of operation phases within the operation cycle at which measurements are taken, $L_T$=current operation cycle and $S_T$=current sampling cycle, and
    the control device causes at least one of the following to occur:
        the operation cycle is changed to $L_{TO}$, and
        the sampling cycle is changed to $S_{TO}$.

2. The information measuring device according to claim 1, wherein:
    the information measuring device is mounted on a rotary shaft device that includes a rotary shaft, and the information measuring device includes the sensor and the control device, the sensor obtains the information on the phenomenon periodically occurring on the rotary shaft device while being synchronized with rotations of the rotary shaft, the control device controls operations of the rotary shaft device and obtains the information via the sensor,
    the control device associates the information obtained at the sampling cycle via the sensor with a rotation phase of the rotary shaft so as to generate change in the phenomenon in one cycle based on the information obtained during the rotation of the rotary shaft performed several times, and
    meanwhile, a rotation cycle of the rotary shaft, the sampling cycle, and a duration of a steady zone where a rotation speed of the rotary shaft is stable at a constant speed are included in the measurement parameters.

3. The information measuring device according to claim 2, wherein
    the control device calculates at least one of the optimum sampling cycle and the optimum operation cycle such that a division number of the phenomenon per cycle is a desired division number.

4. The information measuring device according to claim 1, wherein
    the control device calculates at least one of the optimum sampling cycle and the optimum operation cycle such that a division number of the phenomenon per cycle is a desired division number.

* * * * *